US008375210B2

(12) United States Patent
Miller

(10) Patent No.: US 8,375,210 B2
(45) Date of Patent: Feb. 12, 2013

(54) AUTOMATIC CONFIGURATION OF DEVICES UPON INTRODUCTION INTO A NETWORKED ENVIRONMENT

(75) Inventor: Greg Miller, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/234,141

(22) Filed: Sep. 15, 2011

(65) Prior Publication Data
US 2012/0005478 A1 Jan. 5, 2012

Related U.S. Application Data

(62) Division of application No. 11/323,315, filed on Dec. 30, 2005, now Pat. No. 8,041,035.

(51) Int. Cl.
*H04L 9/32* (2006.01)
(52) U.S. Cl. ........ 713/168; 380/255; 380/277; 380/278; 380/281; 726/22; 726/26; 358/1.14; 358/1.15
(58) Field of Classification Search .................. 380/255, 380/277–278, 281; 726/22, 26; 713/165–171; 358/1.14, 1.15
See application file for complete search history.

(56) References Cited

U.S. PATENT DOCUMENTS

| | | |
|---|---|---|
| 6,366,920 B1 | 4/2002 | Hoose et al. |
| 7,039,688 B2 | 5/2006 | Matsuda et al. |
| 7,203,842 B2 | 4/2007 | Kean |
| 7,382,741 B2 | 6/2008 | Rao |
| 7,646,874 B2 | 1/2010 | Iwamoto et al. |
| 7,757,076 B2 | 7/2010 | Stewart et al. |
| 7,996,516 B2 | 8/2011 | King et al. |
| 2004/0236939 A1 | 11/2004 | Watanabe et al. |
| 2005/0226423 A1 | 10/2005 | Li et al. |

FOREIGN PATENT DOCUMENTS

JP 2005142907 A 6/2005

OTHER PUBLICATIONS

"Device Management Architecture; OMA-AD_DM-V1_0-10050530-D", OMA Open Mobile Alliance Specifications, [Online] May 30, 2005, pp. 1-19.
"OMA Device Management Bootstrap; OMA-TS-DM-Bootstrap-V1_2-20051216-C", OMA Open Mobile Alliance Specifications, [Online] Dec. 16, 2005, pp. 1-27.
Linksys, A Division of Cisco Systems, Inc., "Dual-Band Wireless A/G Media Center Extender—User Guide," 2004, 58 pages.
Notice of Allowance mailed Jun. 10, 2011 issued in U.S. Appl. No. 11/323,315.
International Search Report mailed May 30, 2007 issued in International Application No. PCT/US2006/048418.
Office Action issued Jan. 5, 2012 in CN Application No. 200680049938.6.
Office Action issued Jun. 5, 2012 in JP Application No. 2008-538129, 2 pages.

*Primary Examiner* — Thanhnga B Truong
(74) *Attorney, Agent, or Firm* — Schwabe, Williamson & Wyatt, P.C.

(57) ABSTRACT

Automatic configuration of devices upon introduction into a networked environment, can be implemented, for example, by having a device randomly generate a series of letters and/or numbers, e.g., generate a PIN (Personal Identification Number) that encodes temporary credentials that, in addition to proving ownership and/or control over the device by virtue of having access to the PIN, also allows creating a temporary secure communication channel based on the PIN over which permanent security credentials may be transferred to the device to facilitate provisioning it to securely communicate in the networked environment. In a wireless scenario, a unique SSID and encryption key (WEP or WPA) may be determined as a function of the PIN, where both the device and its access point utilize the PIN to establish a temporary secure communication channel. Various techniques may be used to establish ownership and/or control over the device to prevent inadvertent association of the device with a wrong networked environment.

16 Claims, 4 Drawing Sheets

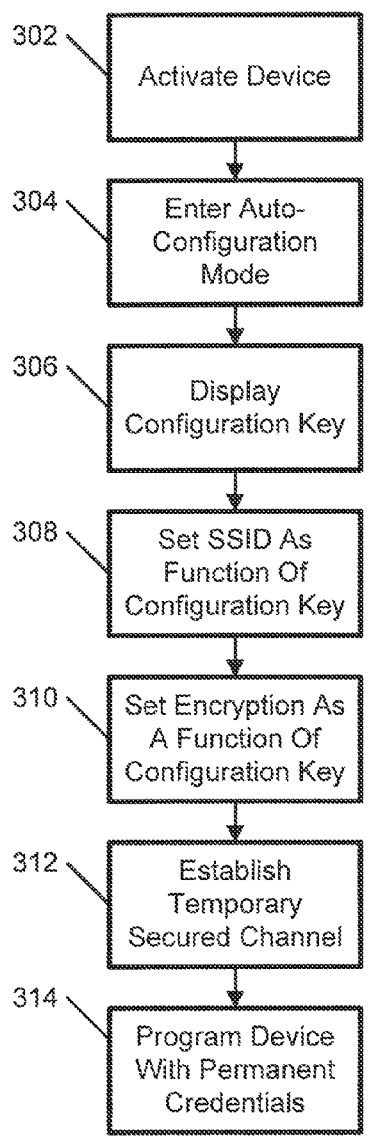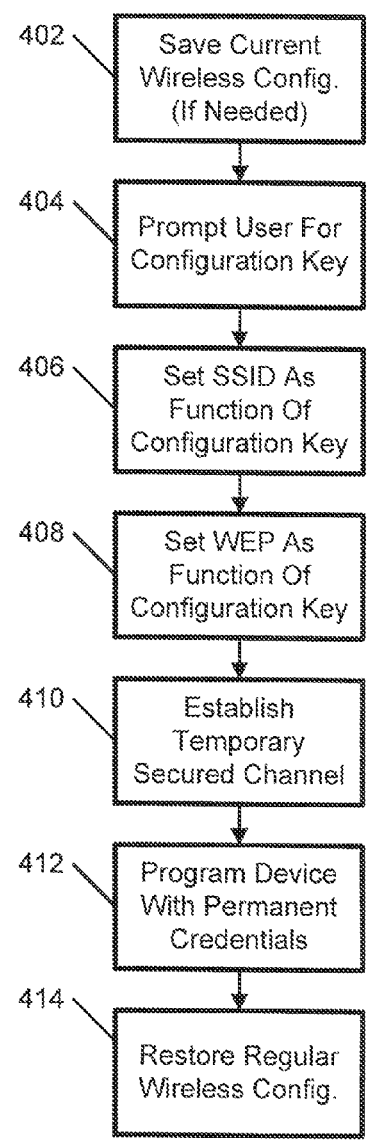

AUTOMATIC CONFIGURATION OF DEVICES UPON INTRODUCTION INTO A NETWORKED ENVIRONMENT

CROSS REFERENCE TO RELATED APPLICATIONS

This is a divisional application of U.S. application Ser. No. 11/323,315 filed Dec. 30, 2005, and entitled "AUTOMATIC CONFIGURATION OF DEVICES UPON INTRODUCTION INTO A NETWORKED ENVIRONMENT."

FIELD OF THE INVENTION

The invention generally relates to configuring a device upon introduction into a networked environment, and more particularly to automatically configuring a wireless device upon introduction into the networked environment.

BACKGROUND

Today, if you want to add a device into a networked environment, such as a wireless device to a wireless network, and you are not interested in laying your network open to intruders, it is necessary to delve into the workings of the security systems, such those based on WEP (Wired Equivalent Privacy or sometimes Wired Equivalency Protocol), WPA (Wi-Fi Protected Access), EAP (extensible authentication protocol), IEEE (Institute of Electrical and Electronics Engineers)'s 802.11i, and the like.

Unfortunately, establishing proper credentials in both the wireless device and its associated access point can be difficult and error-prone. And, it typically needs to be done manually to prove ownership and/or control over the device during its introduction into the networked environment. That is, requiring otherwise, e.g., to have the device initially operate in the open (as is done in some consumer products), leaves the device vulnerable to compromise before it can be secured, and one installing the device risks it being erroneously associated with an incorrect networked environment.

BRIEF DESCRIPTION OF THE DRAWINGS

The features and advantages of the present invention will become apparent from the following detailed description of the present invention in which:

FIG. 3 illustrates a method according to one embodiment for configuring a wireless device introduced into a networked environment including an access point.

FIG. 4 illustrates a method according to one embodiment for an access point or other device to configure the FIG. 3 wireless device being introduced into a networked environment.

DETAILED DESCRIPTION

Figure 1:
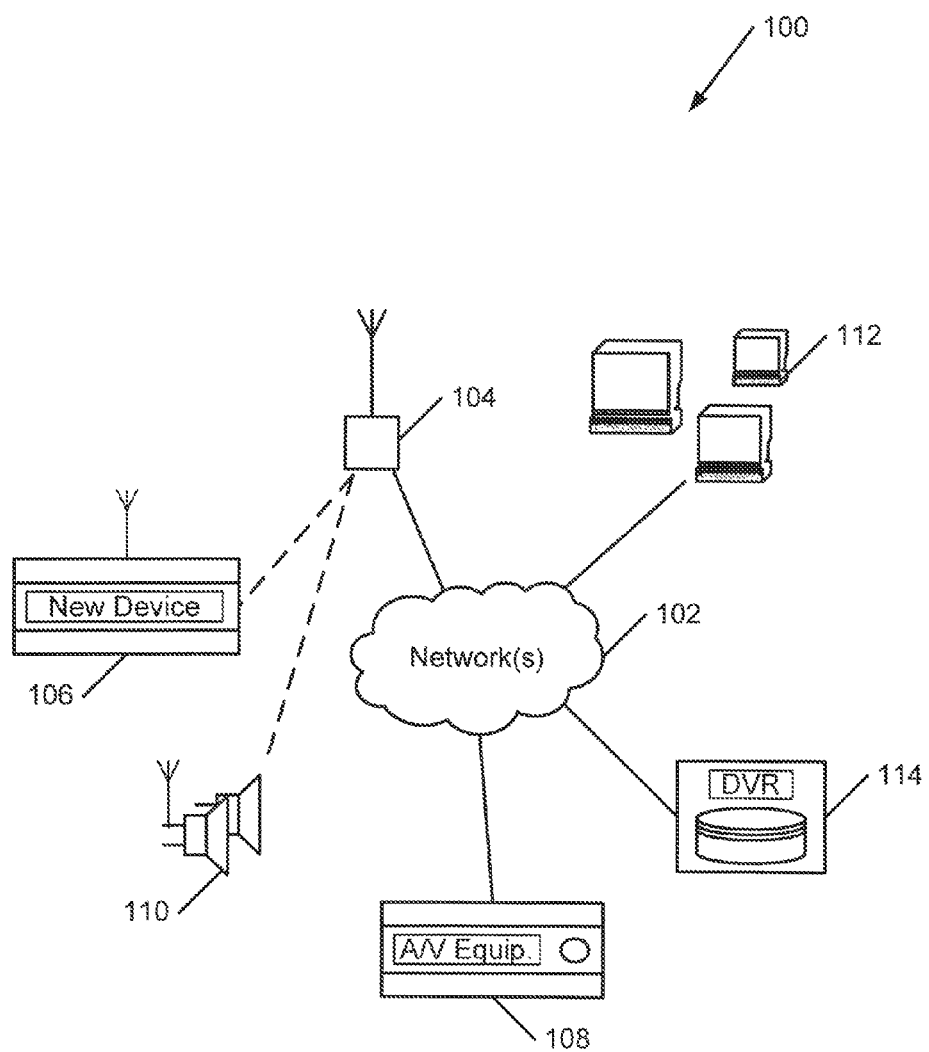
FIG. 1 illustrates an exemplary system of devices that may operate in accord with the principles of the embodiments disclosed herein.

Illustrated embodiments of the invention allow securely configuring a device upon its introduction to a networked environment. In addition, in various embodiments, the installation and configuration techniques described herein provide for confirming access to, control over and/or ownership of the device before automatically installing the device into the networked environment. Such confirmation of access, control and/or ownership allows preventing the new device from accidentally being installed into an incorrect networked environment. Such a problem can occur where there are multiple "digital office" or "digital home" environments near one another.

For example, assuming multiple tenants in an apartment building acquire a device configured to operate as described herein, it would be inconvenient for one person's device to automatically configure itself to work with someone else's networked environment. Such an event may occur when there is potential overlap in networked environments, such as may occur in wireless networking environments and/or wired environments such as the Home Plug Powerline Alliance (see Internet Uniform Resource Locator (URL) www-homeplug-org; note, to prevent inadvertent hyperlinks, periods in the preceding URL were replaced with hyphens); in both of these networked environments the device to be installed may be accessible by a broader spectrum of people and/or devices than expected.

To avoid such problems, as noted above, automatic installation is geared towards first engaging in some activity that shows access to, control of, and/or ownership of the device to be configured into the networked environment. Various embodiments may use various techniques for providing such proof, including displaying on the device a special identifier (ID), Personal Identification Number (PIN), or other data, or providing the ID, PIN, etc. on a label affixed to the device, or in a bar code, or in a RFID (radio frequency identification) marker or other dedicated short range communication (DSRC).device, or transferring it by way of a short range transceiver such as a Bluetooth transmitter, or by way of a dongle or portable flash memory storage such as those incorporated into a USB based portable memory device.

It will be appreciated that these are simply a few exemplary techniques by which to prove access to, control of and/or ownership of the device while also providing data which may be used at least in part to at least initially configure the device for use within the networked environment. In the description and claims that follow the term "configuration key" will be used to collectively reference these and other ways in which such proof may be provided along with data to facilitate configuring the device.

In the illustrated embodiments, the configuration key may be used in wired and wireless networked environments without any special hardware required for the device or access point, router, hub, other device(s), etc. to which the device is connected. That is, embodiments of the invention may be practiced entirely in software or via instructions loaded into general purpose hardware.

FIG. 1 illustrates an exemplary system 100 of devices that may operate in accord with the principles of the embodiments disclosed herein. Illustrated is a network 102, which may be any type of wired and/or wireless based network. If we assume a wired basis for the network as is typical, illustrated is a wireless access point 104 (or "base station"), e.g., a device that communicatively couples wired and wireless networks together. Well known wireless systems include those based on the IEEE (Institute of Electrical and Electronics Engineers) 802.11x family of specifications promulgated by the IEEE for wireless LAN (local-area network) technology. IEEE 802.11 specifies an over-the-air interface between a wireless device 106 and the access point (an "infrastructure" communication mode), as well as communication between two or more wireless clients (an "ad hoc" communication mode).

Assume the wireless device 106 is a music player designed to receive music streamed to it over the network 102, and this player is being introduced into the system 100 with the expectation that it will interact with existing audiovisual processing equipment 108, e.g., a stereo, video processor, television, projector, amplifier, media processors/modifiers/switches, etc. and provide music output over existing wireless speakers 110. The network may also include other devices such as a computer 112 system, DVR (Digital Video Recorder) 114, and other devices not illustrated. It will be appreciated wireless, Home Plug and conventional wired networks have many possible devices that operate thereon and that may be interconnected within the system 100 to perform various desired tasks.

As discussed above, when the wireless music device 106 is introduced into the system 100, to prove access to, control over and/or ownership of the device 106, while also preventing inadvertent association with a wrong network or intentional attack on the device, the device is assumed to power-on into an auto-configuration mode that will, as discussed above, cause data to be presented to a user of the device for use in configuring the device. Access/control/ownership is deemed proven by one's having access to the data that is presented during the auto-configuration. Note that it is presumed herein that the auto-configuration is successful; failure is not discussed in detail. It will be appreciated that if auto-configuration fails and/or is cancelled, conventional techniques may, of course, be used to configure the new device being introduced into the system 100. Configuration of devices will be described in more detail with respect to the following figures.

Figure 2:
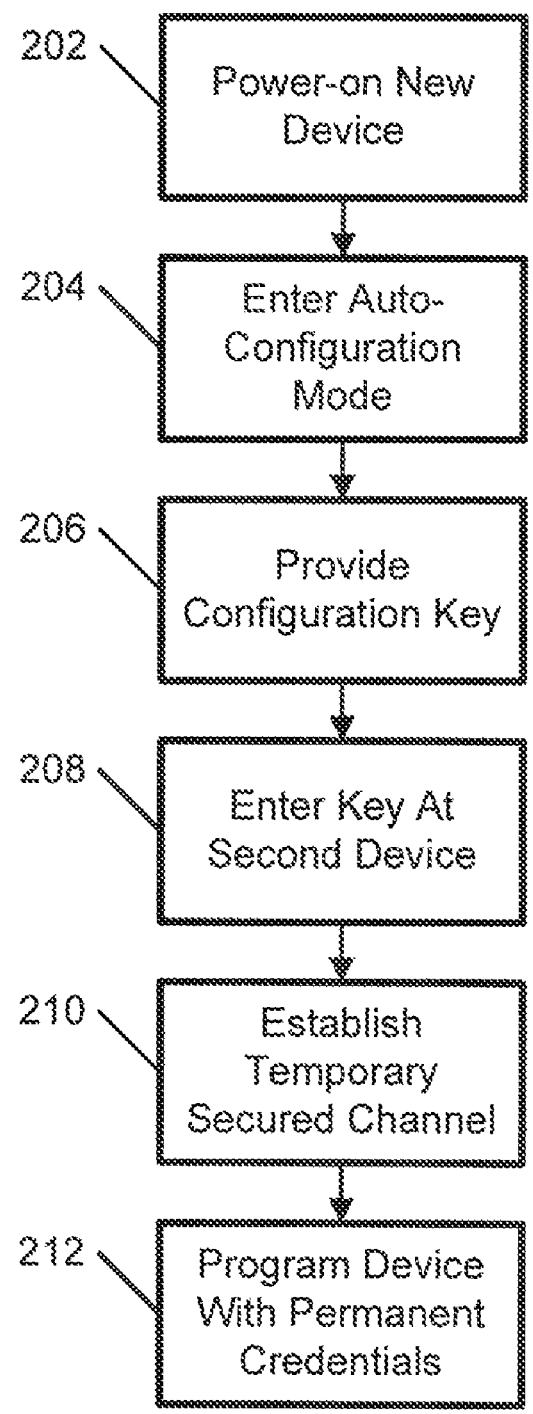
FIG. 2 illustrates a method according to one embodiment for configuring a device introduced into the system of FIG. 1.

FIG. 2 illustrates a method according to one embodiment for configuring, for example, a device 106 introduced into the networked system 100 of FIG. 1.

In the illustrated embodiment, the device is powered-on 202, and defaults to entering 204 an auto-configuration mode in which the device provides 206 a configuration key that can be used to configure the device. In one embodiment, the configuration key is provided by displaying it on a screen, e.g., a LCD (liquid crystal display), TFT (thin film transistor), LED (light emitting diode) array, or other output. In one embodiment, the configuration key is randomly generated, hence allowing essentially identical devices to be manufactured and shipped worldwide. In one embodiment, the configuration is automatically generated responsive to the powering-on of the device until the device is configured automatically or manually, or until auto-configuration is disabled. In an alternate embodiment, as discussed above, the configuration key may be, or be based on, some permanent identifier or other characteristic of the device, such as a serial number, MAC (Media Access Control) address, etc., and provided in a variety of different ways.

Once the key has been provided 206, the key may be entered 208 at a second device responsible for configuring the device. Recall that an assumption is that the networked environment into which the device is being introduced may not be secure in the sense that unexpected parties may have access to packets transmitted on the network, such as a wireless network or Home Plug based wired network. Thus, when the device is introduced, it is expected that an existing device of the networked environment is responsible for configuring the new device. This could be any current device on the network. In a wireless network, the responsible device would typically be, for example, the wireless access point through which the device is attaching to the network. Note, the networked environment may be operating in a secured (encrypted) mode or unsecured (unencrypted) mode; the second device of the network is assumed to communicate with the new device regardless of the network's secured status.

After entering 208 the key at the second device, a temporary secure communication channel is established 210. Note that it is expected that this security may be weak due to the configuration key not representing much data from which to derive the temporary security. That is, in order to have the key easily manageable by a person, e.g., something a person can see and remember for entering 208 into the second device, a relatively short key of a few characters is provided 206; the downside to such convenience for the user is that from a cryptographic perspective shorter keys represent a less secure cryptographic key basis. However, the goal is to create a secured communication channel that is secure enough such that it is impractical if not impossible to break the security of the temporary secured channel. For example, a three character configuration key could be used to determine a 40 bit cryptographic key, such as by repeating one or more characters in the key. In one embodiment, to allow confirming accuracy of PIN entry 208 at the second device, one can create the extra digit(s) of the key as a checksum of the of the configuration key. It will be appreciated an arbitrary key length can be derived from the key's characters depending on how many bits are inherently represented by the characters and/or through repetition or function of the key's characters as input.

Thus, once the temporary secured communication channel is established 210, it is used to securely convey permanent security credentials that can be programmed 212 into the device. The permanent credentials are, in conventional cryptographic fashion, sufficiently lengthy to render relatively secure any channel encrypted with the permanent credentials. Thus, a new device can be introduced into a networked environment in which some or all of the network is not deemed secure, but where the device can be automatically configured upon entry into the networked environment, while also ensuring (by way of requiring access to the provided 206 configuration key) one has proper access, control and/or ownership over the device.

FIG. 3 illustrates a method according to one embodiment for configuring, for example, a wireless device introduced into a networked environment including an access point.

In the illustrated embodiment, after activating 302 the wireless device, e.g., by powering it on, pressing a configuration button, etc., the device enters 304 an auto-configuration mode in which the device displays 306 a configuration key that can be used to configure the device. As discussed above, various techniques may be employed to display or otherwise present the configuration key. Once the key has been displayed 306, a known function is used to generate a SSID (service set identifier) or similar identifier based on the configuration key and set 308 this SSID for use by the device's wireless hardware, e.g. configure the device to use this unique SSID. The function is expected to be known to at least the wireless device and a second device, such as an access point, that will program the new device with permanent security credentials.

After setting 308 the SSID, another known function is used to generate an encryption key (e.g., for WEP, WPA, or the like), and the encryption is set 310 for use by the device. By reference to the "known function" for operations 308, 310 it is meant that any conversion may be used to generate the SSID and WEP/WPA keys from the configuration key. The particular conversion is irrelevant so long as both the new device and the second device responsible for configuring the new device both use the same conversion function. For example, a SSID can be generated by having a predetermined base phrase such as "init" be concatenated with one or more characters of the configuration key, and the WEP/WPA determined by converting some or all of the configuration key characters into a corresponding WEP/WPA hexadecimal sequence.

Once the device has its SSID and WEP/WPA set 308, 310, it can establish 312 a temporary secured channel, e.g., via infrastructure mode or ad hoc, with the access point or other device responsible for programming 314 the device with permanent security credentials.

FIG. 4 illustrates a method according to one embodiment for an access point or other device to configure the FIG. 3 wireless device being introduced into a networked environment.

Assuming FIG. 3 items 302-310 have occurred or are being performed, an access point such as FIG. 1 item 104 can prepare to manage the new device and program it with proper security credentials. Note that security credentials can include more than cryptographic data, and may also include local policies, rules, terms of service, billing rates, etc. that may be conveyed to the new device as applicable to the networked environment into which the new device is being introduced. In the illustrated embodiment, if needed, the access point's current wireless configuration, e.g., its SSID and WEP or WPA key is saved 402. It will be appreciated that saving the configuration may be unnecessary in certain environments in which a profile manager or equivalent is available, where instead of replacing the current configuration, instead a higher priority new temporary profile is created based on the configuration key for the new device.

After saving 402, as needed, the current configuration, the user is prompted 404 for the configuration key that was displayed 306 on the new device. As discussed above, access to this key proves access to, control over and/or ownership of the new device and hence ensures that this device really should be allowed to enter the networked environment. In complementary fashion to FIG. 3 operations 308, 310, the access point sets 406, 408 its SSID and WEP/WPA encryption keys as a function of the device's configuration key. Once set, the access point then establishes 410 a temporary secured channel complementary to FIG. 3 operation 312. Note that various techniques may be employed to reconfigure the access point to communicate with the new device. In one embodiment, the access point may have a simple user interface built into it for entering the configuration key. In another embodiment, software may be run on a computer or other machine communicatively coupled with the access point where this computer or machine re-programs the access point for operations 406, 408.

Once the temporary secure connection is established 312, 410, the new device may be programmed with permanent security credentials. As with configuring the access point, it will be appreciated that various techniques may be employed to program the new device. For example, in one embodiment, the access point may have built-in functionality to automatically push its permanent wireless credentials to the new device over the temporary secured channel. Or, in another embodiment, software may be run on a computer or other machine communicatively coupled with the access point where this computer or machine programs the new device with permanent security credentials for performing operation 412.

Once the new device has been programmed with the permanent credentials, the temporary communication channel is no longer needed and the access point may return 414 to its regular (e.g., saved 402) wireless configuration. In an embodiment as discussed above using a profile manager or equivalent, return simply entails deleting the temporary profile created for communicating with the new device. In another embodiment, return may require re-setting the access point's SSID and WEP/WPA keys. As discussed above, the access point may itself be programmed to restore its state, or an external computer or other machine may manipulate its state.

Thus, a new device can be introduced into a wireless networked environment, where the device can be automatically configured upon entry, while also ensuring (by way of requiring access to the displayed 306 configuration key) that one has proper access, control and/or ownership over the new device.

Figure 5:
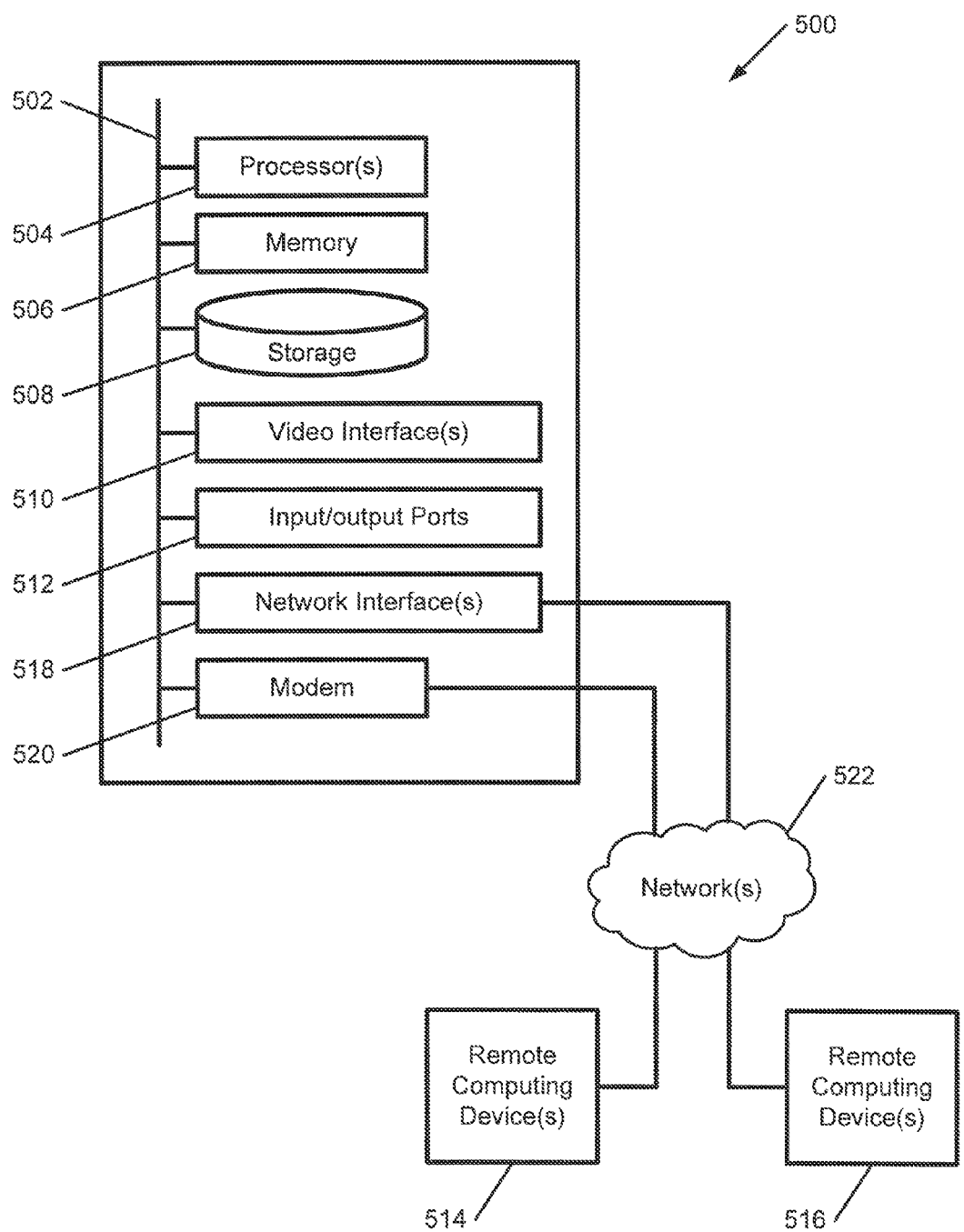
FIG. 5 illustrates a suitable computing environment in which certain aspects of the invention may be implemented.

FIG. 5 and the following discussion are intended to provide a brief, general description of a suitable environment in which certain aspects of the illustrated invention may be implemented. As used herein below, the term "machine" is intended to broadly encompass a single machine, or a system of communicatively coupled machines or devices operating together. Exemplary machines include computing devices such as personal computers, workstations, servers, portable computers, handheld devices, e.g., Personal Digital Assistant (PDA), telephone, tablets, etc., as well as transportation devices, such as private or public transportation, e.g., automobiles, trains, cabs, etc.

Typically, the environment includes a machine 500 that includes a system bus 502 to which is attached processors 504, a memory 506, e.g., random access memory (RAM), read-only memory (ROM), or other state preserving medium, storage devices 508, a video interface 510, and input/output interface ports 512. The machine may be controlled, at least in part, by input from conventional input devices, such as keyboards, mice, etc., as well as by directives received from another machine, interaction with a virtual reality (VR) environment, biometric feedback, or other input source or signal.

The machine may include embedded controllers, such as programmable or non-programmable logic devices or arrays, Application Specific Integrated Circuits, embedded computers, smart cards, and the like. The machine may utilize one or more connections to one or more remote machines 514, 516, such as through a network interface 518, modem 520, or other communicative coupling. Machines may be interconnected by way of a physical and/or logical network 522, such as the network 102 of FIG. 1, an intranet, the Internet, local area networks, and wide area networks. One skilled in the art will appreciated that communication with network 522 may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data such as functions, procedures, data structures, application programs, etc. which when accessed by a machine results in the machine performing tasks or defining abstract data types or low-level hardware contexts. Associated data may be stored in, for example, volatile and/or non-volatile memory 506, or in storage devices 508 and/or associated storage media, including conventional hard-drives, floppy-disks, optical storage, tapes, flash memory, memory sticks, digital video disks, etc., as well as more exotic mediums such as machine-accessible biological state preserving storage. Associated data may be delivered over transmission environments, including network 522, in the form of packets, serial data, parallel data, propagated signals, etc., and may be used in a compressed or encrypted format. Associated data may be used in a distributed environment, and stored locally and/or remotely for access by single or multi-processor machines. Associated data may be used by or in conjunction with embedded controllers; hence in the claims that follow, the term "logic" is intended to refer generally to possible combinations of associated data and/or embedded controllers.

Thus, for example, with respect to the illustrated embodiments, assuming machine 500 embodies the new device 106 of FIG. 1, then remote machines 514, 516 may respectively be the FIG. 1 access point 104 and computer 112. It will be appreciated that remote machines 514, 516 may be configured like machine 500, and therefore include many or all of the elements discussed for machine.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method comprising:
    by a first machine, receiving an input configuration key corresponding to a configuration key of a second machine, the configuration key being determined by the second machine during a configuration mode of the second machine;
    by the first machine, generating a first cryptographic key based on one or more characters in the input configuration key;
    by the first machine, determining an access point identifier and a third cryptographic key;
    by the first machine, establishing a secured channel with the second machine based on the first cryptographic key, the second machine being configured to:
        generate a second cryptographic key identical to the first cryptographic key based on one or more characters in the configuration key; and
        facilitate said establishing the secured channel based on the second machine having generated the second cryptographic key; and
    by the first machine, providing a configuration to the second machine over the secured channel, the configuration including the determined access point identifier and the third cryptographic key; and
    by the first machine, establishing an other secured channel with the second machine based on the determined access point identifier and the third cryptographic key.

2. The method of claim 1, wherein providing the configuration comprises providing data to be applied to the second machine corresponding to a manual setup of the second machine.

3. The method of claim 1, further comprising:
    by the first machine, determining a checksum for the input configuration key; and
    by the first machine, validating the input configuration key based on the checksum.

4. The method of claim 3, wherein:
    receiving the input configuration key comprises receiving first characters and second characters in the input configuration key;
    determining the checksum comprises determining the second characters from the input configuration key;
    validating the input configuration key comprises validating the first characters based at least in part on the second characters; and
    generating the first cryptographic key comprises generating the first configuration key based at least in part on the validated first characters.

5. The method of claim 1, wherein receiving comprises receiving the input configuration key via a short range wireless transmission, an output of a scanning of a marker of the second machine, a detection of a radio-frequency identifier (RFID) encoding of the input configuration key, or entries of a keypad.

6. The method of claim 1, further comprising, by the first machine, switching the first machine from a current wireless profile including a current access point identifier and a current cryptographic key to another wireless profile utilizing the secured channel via an other access point identifier and the generated first cryptographic key.

7. One or more non-transitory computer-readable media comprising instructions that are configured, in response to execution by a first computing device, to cause the first computing device to:
    receive an input configuration key corresponding to a configuration key of a second computing device, the configuration key being determined by the second machine during a configuration mode of the second computing device;
    generate a first cryptographic key based on one or more characters in the input configuration key;
    determine an access point identifier and a third cryptographic key;
    establish a temporary secured channel with the second computing device based on the first cryptographic key, the second computing device being configured to:
        generate a second cryptographic key identical to the first cryptographic key based on one or more characters in the configuration key; and
        facilitate said establishing the temporary secured channel based on the second computing device having generated second the cryptographic key
    provide a configuration to the second computing device over the temporary secured channel, such that the configuration includes the access point identifier and the third cryptographic key; and
    establish an other secured channel with the second machine based on the determined access point identifier and the third cryptographic key.

8. The computer-readable media of claim 7, wherein the input configuration key has a first portion and a second portion based on the first portion, and wherein the instructions are further configured to cause the first computing device to validate entry of the first portion into the first computing device based at least in part on the second portion.

9. The computer-readable media of claim 7, wherein the instructions are further configured to cause the first computing device to receive the input configuration key via a short range wireless transmission, an output of a scanning a marker of the second computing device, a detection of a radio-frequency identifier (RFID) encoding of the input configuration key, or entries of a keypad.

10. The computer-readable media of claim 7, wherein the instructions are further configured to cause the first computing device to switch from a current wireless profile including a current access point identifier and a current cryptographic key to the other wireless profile utilizing the secured channel via an other access point identifier and the generated first cryptographic key.

11. An apparatus comprising:
a computing processor; and
logic configured to be executed by the processor to:
  receive an input configuration key corresponding to a configuration key of a device, the configuration key being determined by the device during a configuration mode of the device;
  generate a first cryptographic key based on one or more characters in the input configuration key;
  determine an access point identifier and a third cryptographic key;
  establish a secured channel with the device based on the first cryptographic key, the device being configured to:
    generate a second cryptographic key identical to the first cryptographic key based on one or more characters in the configuration key; and
    facilitate said establishing the temporary secured channel based on the device having generated the second cryptographic key; and
  provide a configuration to the device over the temporary secured channel, such that the configuration includes the access point identifier and the third cryptographic key; and
  establish an other secured channel with the device based on the determined access point identifier and the third cryptographic key.

12. The apparatus of claim 11, wherein the logic is configured to provide the configuration through provision of data to he applied to the device corresponding to a manual setup of the device.

13. The apparatus of claim 11, wherein the logic is further to be executed by the processor to:
  determine a checksum for the input configuration key; and
  validate the input configuration key based on the checksum.

14. The apparatus of claim 13, wherein the logic is configured to:
  receive the input configuration key through receipt of first characters and second characters in the input configuration key;
  determine the checksum through determination of the second characters from the input configuration key;
  validate the input configuration key through validation of the first characters based at least in part on the second characters; and
  generate the first cryptographic key through generation of the first configuration key based at least in part on the validated first characters.

15. The apparatus of claim 11, wherein the logic is further to be executed by the processor to receive the input configuration key via a short range wireless transmission, an output of a scanning of a marker of the device, a detection of a radio-frequency identifier (RFID) encoding of the configuration key, or entries of a keypad.

16. The apparatus of claim 11, wherein the logic is further to be executed by the processor to switch the apparatus from a current wireless profile including a current access point identifier and a current cryptographic key to an other wireless profile utilizing the secured channel via an other access point identifier and the generated first cryptographic key.

* * * * *